Nov. 7, 1961 R. P. BOWLER 3,007,506
DISPOSABLE TIRE TREADS
Filed March 26, 1959

INVENTOR.
ROBERT P. BOWLER
BY James P. Malone

United States Patent Office 3,007,506
Patented Nov. 7, 1961

3,007,506
DISPOSABLE TIRE TREADS
Robert P. Bowler, East Meadow, N.Y., assignor of fifty percent to James P. Malone, Syosset, N.Y.
Filed Mar. 26, 1959, Ser. No. 802,183
1 Claim. (Cl. 152—175)

This invention relates to tire treads for automobiles which may be cemented or glued onto the existing tire.

More specifically the invention relates to special treads, for instance, snow treads, which are disposable and which will wear out in a few days' time on dry roads.

One of the difficulties with metal chains is that they are difficult to put on and involve jacking up the car. In most locations in the United States chains are only useful for a few hours until the roads are cleared, and they can not be used on dry roads. Snow tires which have become more popular also involve changing the wheels of the car and are generally left on all winter even though they are only needed perhaps one or two days.

In view of these difficulties most drivers do not bother at all with metal chains or snow tires and are, therefore, helpless and unsafe under snow conditions.

The present invention solves these difficulties by providing a snow tread or other special treads which are easy to put on and which do not have to be removed. The treads are preferably made of a plastic or rubberized plastic material which will wear off in a short time when used on dry roads. They are, therefore, in the nature of a disposable item and they can be made cheap enough to fulfill this function.

More specifically, the invention comprises a strip of the desired tread which is cemented or glued onto the existing tires. The treads may be connected by light plastic or paper sheet to provide easy handling and insure the proper spacing. The treads are directly cemented to the existing tires by means of strong water-proof adhesives not requiring heat or pressure, for instance, the epoxy type adhesives or equivalent.

Accordingly, a principal object of the invention is to provide new and improved tire treads.

Another object of the invention is to provide new and improved disposable tire treads.

Another object of the invention is to provide new and improved disposable snow tire treads which are easy to apply.

Another object of the invention is to provide new and improved tire treads which are easy to apply and economical to be disposed after one use, and reduce labor costs specifically on fleets of vehicles.

Another object of the invention is to provide special treads at no real cost as the existing tire wear is prolonged.

Another object of the invention is to obtain the extra wear given by recapping, at less expense and without removing the wheel.

These and other objects of the invention will be apparent from the following specification and drawings, of which:

Figure 1:
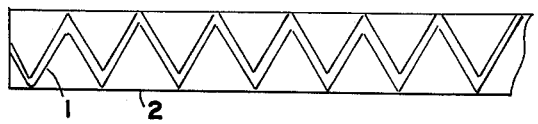
FIGURES 1 and 2 are plan views of an embodiment of the invention.
Figure 1A:
FIGURES 1A and 2A are side views of the embodiments of FIGURES 1 and 2.
Figure 3:
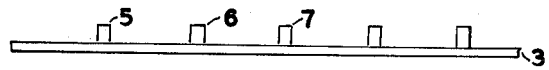
FIGURE 3 is a side view of another embodiment of the invention.

Referring to the figures, the treads may be of any convenient pattern, for instance the V-shape pattern shown in FIGURE 1. In FIGURE 1 the tread 1 is continuous and has a V-shaped or zig-zag pattern. If designed as a snow tread it should preferably have a thickness of at least one inch and preferably has a cross section of at least one inch square. The tread strip 1 is preferably mounted on a spacer strip 2 which may be a light plastic sheet or fabric or even paper. The only purpose of the spacer strip 2 is to hold the tread in the proper spacing and make easy handling when the tread is rolled and when it is applied to the tire. The strip 2, FIGURE 1, is not relied on for strength as it is preferable that the treads themselves be bonded to the existing tire. However, if desired the base strip may be made a part of the structure as in FIGURE 3 by making it of a thicker sheet 3. In the embodiment of FIGURE 3 the treads 5, 6 and 7 would be factory bonded to the base strip 3 and the base strip would then be cemented onto the existing tire.

Figure 2:
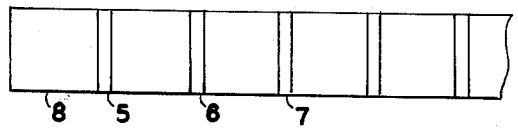
Figure 2A:
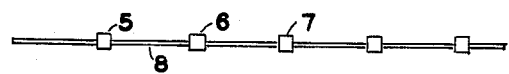

FIGURES 2 and 2A show another embodiment of the invention wherein the treads 5, 6, 7 and so forth are separate, like rungs on a ladder, and are separately mounted on the existing tire. For convenience and ease in handling the short treads 5, 6, and 7, they are preferably connected together with a light connecting strip or strips 8. The only purpose of the spacer strip or strips 8 is to hold the tread in the proper spacing and provide easy handling when the tread is rolled for packaging and when it is applied to a tire. The strip or strips 8 are not relied on for strength but are only used for handling and spacing the treads.

Heretofore, it would probably not be possible to bond the strip of tread onto an existing tire with sufficient strength in the absence of expensive vulcanizing apparatus. However, new adhesives have been developed, for instance, those of the epoxy type, which are water-proof, do not require heat or pressure, can be applied with minimum labor, and are strong enough for the intended purpose. These adhesives may be pre-applied to the treads and made adhesive at the time of application to the tires by brushing on a catalyst or solvent or removing a paper or other cover seal. Alternatively, the strips may be supplied without any adhesive and they may be applied wet with a brush or spray. It may be desirable to add a plasticizer to the epoxy resin to provide additional resiliency.

Figures 4, 5:
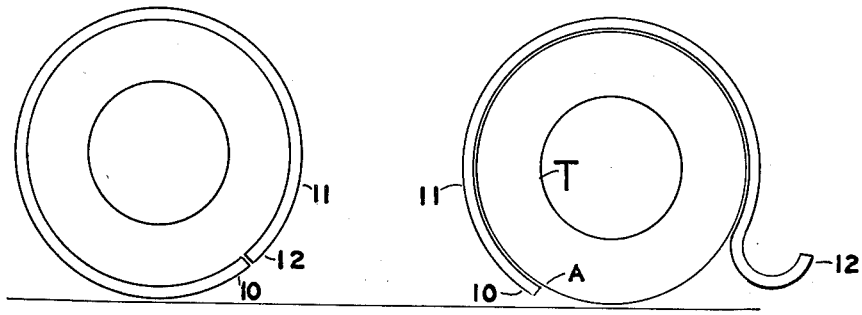
FIGURES 4 and 5 are diagrams illustrating the use of the invention.

FIGURES 4 and 5 show the method of applying the strips of tread to the existing tire without removing the tire from the vehicle or jacking up the vehicle. Referring to FIGURE 4, after the adhesive is applied to the strip and preferably also to the tire surface, the end 10 of the strip 11 is pressed by hand across the surface of the tire at the point A and then laid around the tire as illustrated in FIGURE 4. The vehicle is then moved about one-quarter turn of the wheel so that the tail 12 of the strip may be placed against the tire. Before the adhesive has fully set, the vehicle should be preferably moved about one car length to press the strip against the tire surface.

Other water-proof adhesives such as Fairprene No.

4678 or Fairprene Type 4 manufactured by du Pont Fabrics Division, Fairfield, Connecticut, may be used. They are designed for bonding rubber, synthetic rubber, vinyl and other types of synthetic material to each other or even to wood or metal. Fairprene 4678 uses a solvent of methyl ethyl ketone and Fairprene Type 4 uses a solvent of toluene or gasoline.

Therefore, the present invention provides disposable snow or other tire treads which are easy to apply and need not be removed. They will wear off with use, will prolong the life of the tires, and will eliminate the cost of chains and labor for many changes of chains. The present invention may even eliminate the need for recapping.

I claim:

Tire tread means comprising a plurality of discrete unconnected treads, means to connect said unconnected treads together with predetermined spacing and orientation relative each other comprising spacing strip means connected to the lateral side portions of said treads and adhesive means on one side of said treads for connecting said spaced treads directly to a vehicle mounted tire, said treads being of material adapted to wear out with a few days' use, said spacing strip means being of weak material and substantially thinner than said treads and being used solely to space said treads.

References Cited in the file of this patent

UNITED STATES PATENTS

| | | |
|---|---|---|
| 822,307 | Scarborough et al. | June 5, 1906 |
| 1,043,407 | Dennis | Nov. 5, 1912 |
| 1,082,203 | Marshall | Dec. 23, 1913 |
| 1,372,938 | Goffield | Mar. 29, 1921 |
| 1,488,544 | Hogan | Apr. 1, 1924 |
| 1,553,883 | Theis | Sept. 15, 1925 |
| 1,632,497 | Noel | June 14, 1927 |
| 2,345,518 | Wendel | Mar. 28, 1944 |
| 2,689,200 | Johnson | Sept. 14, 1954 |

OTHER REFERENCES

Publication, "Paint, Oil and Chemical Review," Nov. 20, 1952, page 24.